Nov. 3, 1970   R. D. RAPER ET AL   3,537,134
MACHINE FOR CONTINUOUSLY BLOW-MOLDING HOLLOW
RESIN PLASTIC ARTICLES
Filed Oct. 20, 1967   6 Sheets-Sheet 6

INVENTOR.
Robert D. Raper,
& John P. Kinsly
BY William Cleland
Attorney

United States Patent Office 3,537,134
Patented Nov. 3, 1970

3,537,134
MACHINE FOR CONTINUOUSLY BLOW-MOLDING HOLLOW RESIN PLASTIC ARTICLES
Robert D. Raper, Canal Fulton, and John P. Kinsly, Cuyahoga Falls, Ohio, assignors to Samco, Inc., Fulton, Ohio, a corporation of Ohio
Filed Oct. 20, 1967, Ser. No. 676,899
Int. Cl. B29c 3/00
U.S. Cl. 18—5      7 Claims

ABSTRACT OF THE DISCLOSURE

Blow-molding machine has mold-supporting wheel rotated at given r.p.m. through positive drive means. Mating hollow mold halves continuously moved with wheel about circular path, and each opened and closed by mechanism carried by wheel, including fixed cam means in path of rotating wheel by which each mold closing is positive and rapid at a precise point in circular path at which, without stopping wheel, mold clamps about length of extruded resin plastic continuously fed plastic parison from an extruder. At precise point of full mold-closing operation cutter automatically severs length from plastic parison without interfering with continuous circular movement of respective mold through accurately timed blow-molding and article-ejecting operations of same.

BACKGROUND OF INVENTION

Blow-molding machines have heretofore employed a principle of rotating a plurality of molds past a loading station to receive plastic parison from an extruder nozzle. This type of machine, however, has usually required either that a rotating mold carrier of the machine be intermittently stopped and started at a loading station, or that the parison be fed to each mold of a continuously rotated mold carrier to receive a guided extent of parison in a line more or less tangent to the arcuate path of a point in the centerline of the mold. Both of these types of machines were objectionable for various reasons. Such intermittent operation was objectionable because of resultant low productiveness of the machine. Continuously operable blow-molding machines employing tangential feeding of the plastic parison necessarily required use of a high number of molds, such as ten or more, in order to minimize the gaps between the peripherally spaced molds and thereby provide appropriate support for the continuous plastic parison gripped by mating mold halves. As the parison had to be fed to each mold at an angle to the vertical, the carriers were provided with guide bars to align extents thereof with the centerline of the mold. The necessity for use of a relatively large number of molds on the carrier, moreover, substantially increased tooling investment and capital expense.

SUMMARY OF INVENTION

In the present invention, a rotating wheel or carrier moves a plurality of sectional cavity molds continuously around a circular path past a dependent, continuously extruded extent of hot, pliable, plastic material at an exact loading point through which the axis of said extent passes. The instant a central axis of each mold passes said loading point, the mating sections of the respective molds snap shut on a requisite length of parison, and at the same instant said length of parison is severed from said extent thereof, and the respective molds continue on through article-forming and article-ejecting cycles of operation of the machine.

Opening and closing of each respective mold can be accomplished in predetermined positive manner and the extruder is set to run continuously at a constant speed and timing required to position a given length of parison in each mold at the aforesaid loading point. The rate of extrusion is accurately synchronized with the time it takes each mold to reach the loading point at which full closing of the mold takes place, and such accurate synchronization is accomplished through a positive driving connection from the same source of power as that which drives the wheel.

One object of the present invention is to provide a continuously operable blow-molding machine wherein is obviated tangential feeding of the plastic to the moving molds and productiveness of the machine is greatly increased with fewer molds.

Another object of the invention is to provide a machine of the character described having an improved mold-closing mechanism which is self-operating to hold the respective mold sections closed during each article-forming cycle of operation, independently of the actuating means for initiating operation of the mold-closing mechanism.

Another object of the invention is to provide a blow-molding machine of the character described having a positive linked-phase relationship between various stages of operation of the machine.

Another object of the invention is to provide a blow-molding machine wherein all supporting movement of the mold units and parts thereof are positive and without play, whereby operation of the system is smooth and free from damaging shocks.

Still another object of the invention is to provide a machine of the character described having improved means for automatically varying the wall thickness of each individual length of parison fed to the respective molds according to variations in shapes and sizes of articles to be blow-molded.

Other objects of the invention will be manifest from the following brief description and the accompanying drawings.

Figure 1:
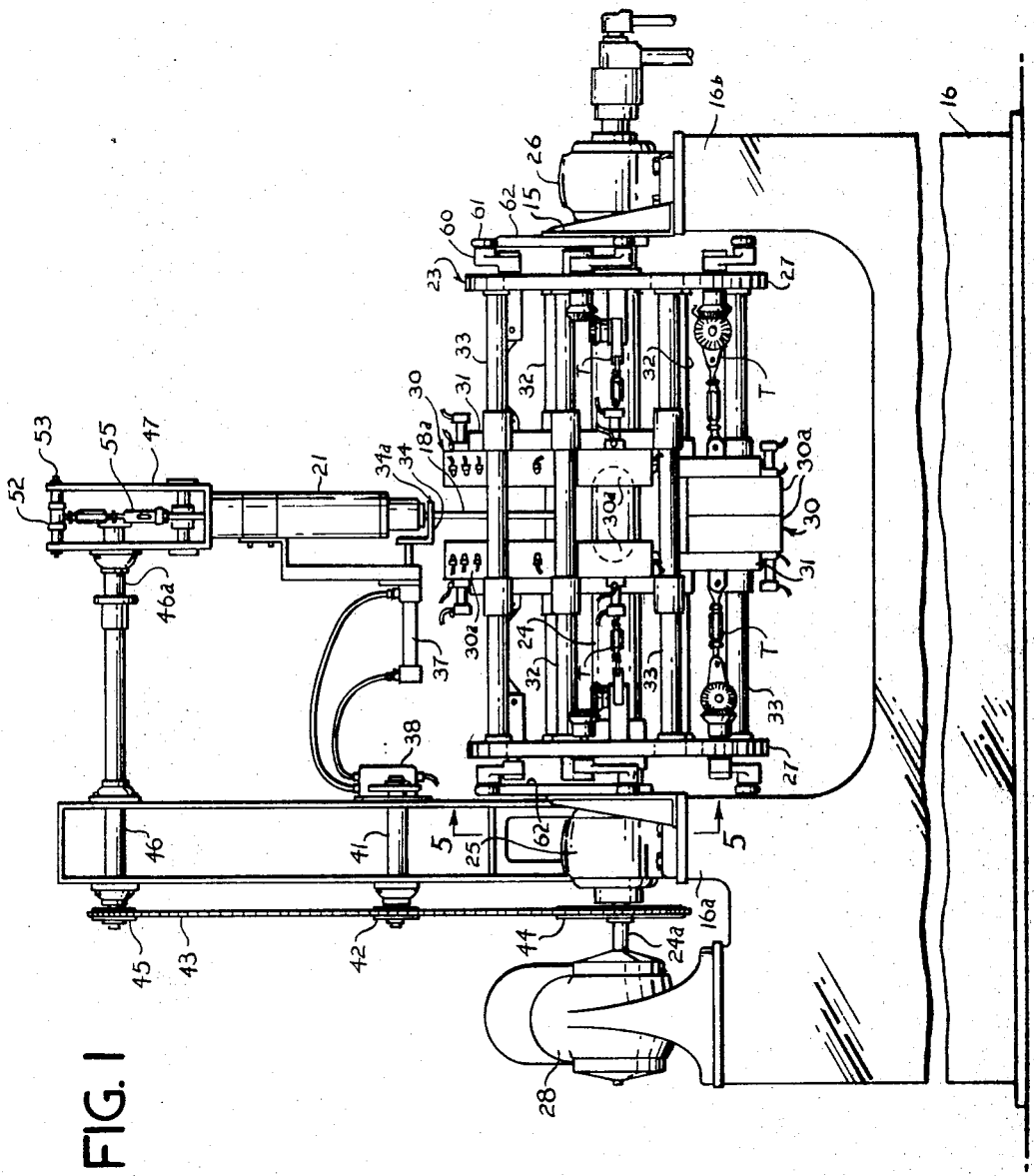
FIG. 1 is a front elevation of a blow-molding machine embodying the features of the invention.
Figure 2:
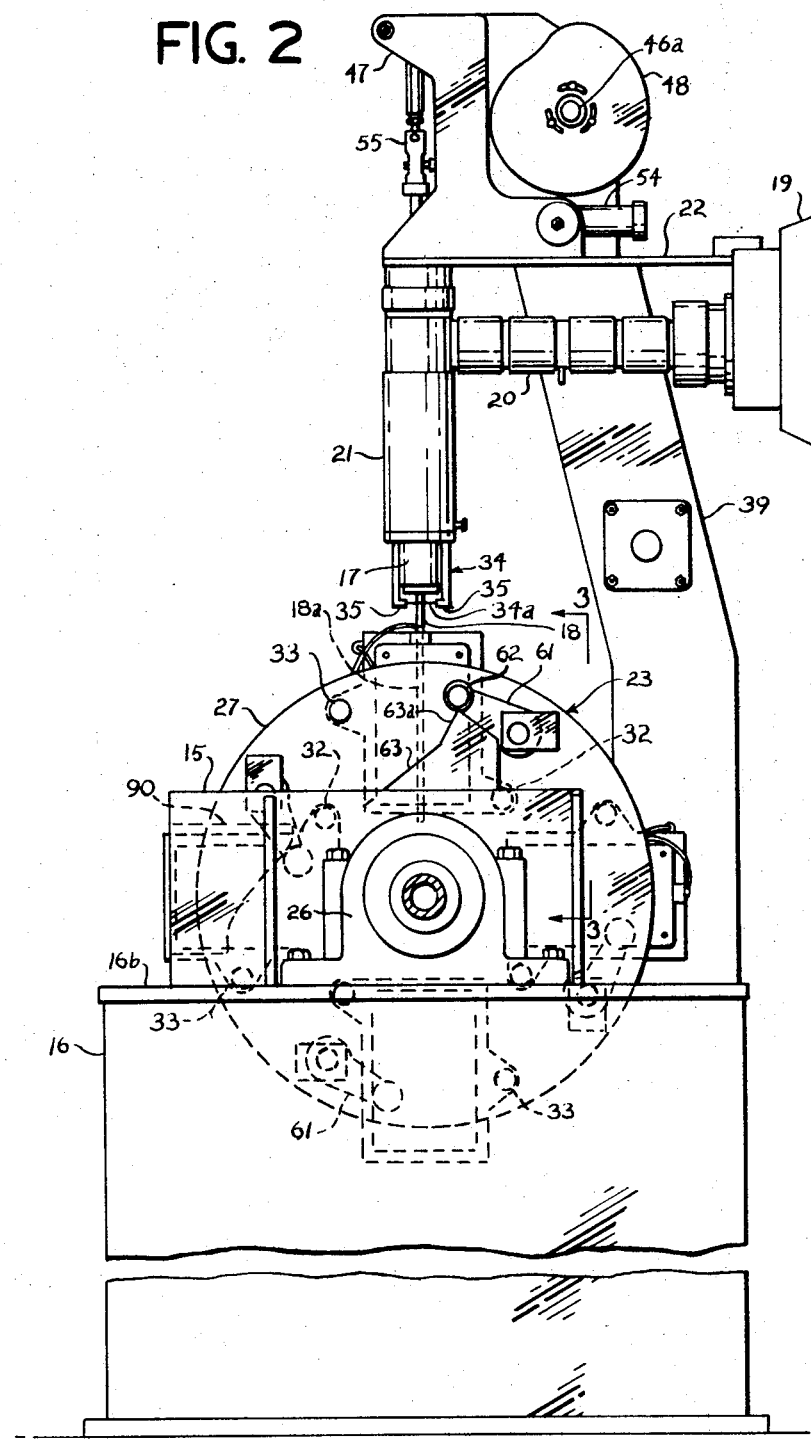
FIG. 2 is an end elevation of the machine as viewed from the right of FIG. 1, on an enlarged scale, and partly broken away.

Referring particularly to FIGS. 1 and 2, there is illustrated a blow-molding machine 15, including a supporting frame 16 in association with a plastic extruding nozzle 17 adapted continuously to extrude a tubular parison 18 of hot, pliable, synthetic resin plastic, such as vinyl, polyethylene, or polystyrene, from an extruder 19 of known type (shown in part), through heat-controlled, horizontal and vertical connections 20 and 21, respectively, further supported on an overhead platform 22 supported on the extruder 19. The continuously extruded parison tends to depend freely from the nozzle 17 in a vertical line which intersects a horizontal axis of a mold-carrying wheel 23, centrally thereof as shown in FIG. 1, which comprises a hollow shaft 24, journalled in bearings 25 and 26 mounted on two upward extensions 16a and 16b of frame 16, and laterally spaced plates 27, 27 affixed on shaft 24 to rotate therewith. Wheel 23, in normal operation, is rotated in clockwise direction as viewed in FIG. 2, through a reduced shaft extension 24a connected to a suitable electric motor 28 on frame 16.

A plurality of article-forming molds 30, 30 (four being shown) each include mating mold sections 30a, 30a affixed on axially spaced platens 31, 31 which are axially slidably mounted on a pair of inner and outer guide bars 32 and 33, respectively, affixed in parallelism to each other and to the axis of the wheel shaft 24. These guide bars are arranged in peripherally and radially stepped relation to each other (see FIG. 2) so that a substantial length or parison can be received between the mold sections, while it is still being extruded, without interference with the leading guide bars 32 on the clockwise rotating wheel until the topmost approaching mold reaches the dead-center position as shown in FIGS. 1 and 2. In an exact instant that the last mentioned dead-center position of the mold is reached, an exact length 18a of parison is cut by a double-edged knife blade 34a on a reciprocable holder 34, and the two mold sections at the same instant are simultaneously moved by a pair of oppositely disposed toggle mechanisms T best shown in FIGS. 3 and 4, to be in fully closed, mating relation without interruption in the continuous clockwise rotation of the wheel. The article-forming mold cavities for making plastic bottles, for example, include portions for forming the neck of the bottle, and in this neck-forming part of the mold there may be provided an injection pin or needle of known type (not shown), operable to pierce the neck-forming portion of the parison 18 when the mold is closed.

For reciprocating cutter blade 34a, it may be removably and replaceably mounted between spaced fingers 35, 35 of bifurcated holder 34, which is affixed on a piston rod extension 36 of a fluid pressure actuated plunger (not shown) in a cylinder 37 suitably mounted on the nozzle (see FIG. 1). Cylinder 37 is alternately actuated to move the cutter 34a in one of opposite directions four times during each full rotation of the wheel, as controlled by a four-way valve 38 mounted on one side of a vertical column 38 mounted on upright 16a. This valve may be actuated by a cam on a shaft 41, journalled through the column 39 for rotation by a small sprocket 42 on the shaft 41 at the other side of the column, sprocket 42 in turn being driven by one side extent of a continuous link chain 43 in positive driving connection between a relatively large sprocket 44 keyed on the power-driven shaft extension 24a and a small sprocket 45, keyed on a shaft 46 journalled through the upper end of upright 39 for another purpose to be described later. The arrangement is such that each time a mold closes, as shown in FIG. 2, the blade 33 cuts through the parison 18 in one lateral direction or the other.

Referring to FIGS. 1, 2, and 7 to 9, the aforesaid driven shaft 46 has an extension 46a to a housing 47, mounted on the overhead platform 22, on which shaft extension a cam 48 is operable to control the thickness of length 18a of parison 18 as they are extruded from nozzle 17. To this end the continuously rotating cam 48 engages a roller 49 on a vertically depending arm 50 of an L-shaped lever 51, and a shorter arm 52 at the upper end of arm 50 is pivoted at 53 to the upper portion of housing 47 to be rocked up and down by rotation of the cam in continuous contact with roller 49, against the yielding resistance of a dashpot or like yieldingly restraining device 54. Pivotally connected to the upper arm 52 may be a vertically adjustable linkage 55 connected at its lower end to a thickness-controlling needle 56 within the extruder nozzle 17, and adapted to cause successive extents 18a of extruded parison to have requisite varying wall thicknesses according to variations in the amounts that extends 18a have to be expanded within the respective mold. Thus, a given pattern of thickness variations for each extruded length of parison 18a may be kept constant by the cam 48 being continuously rotated by the above described positive connection to the same drive means which rotates the mold carrier or wheel, and which controls the opening and closing movements of the individual molds in a manner to be described.

Figure 3:
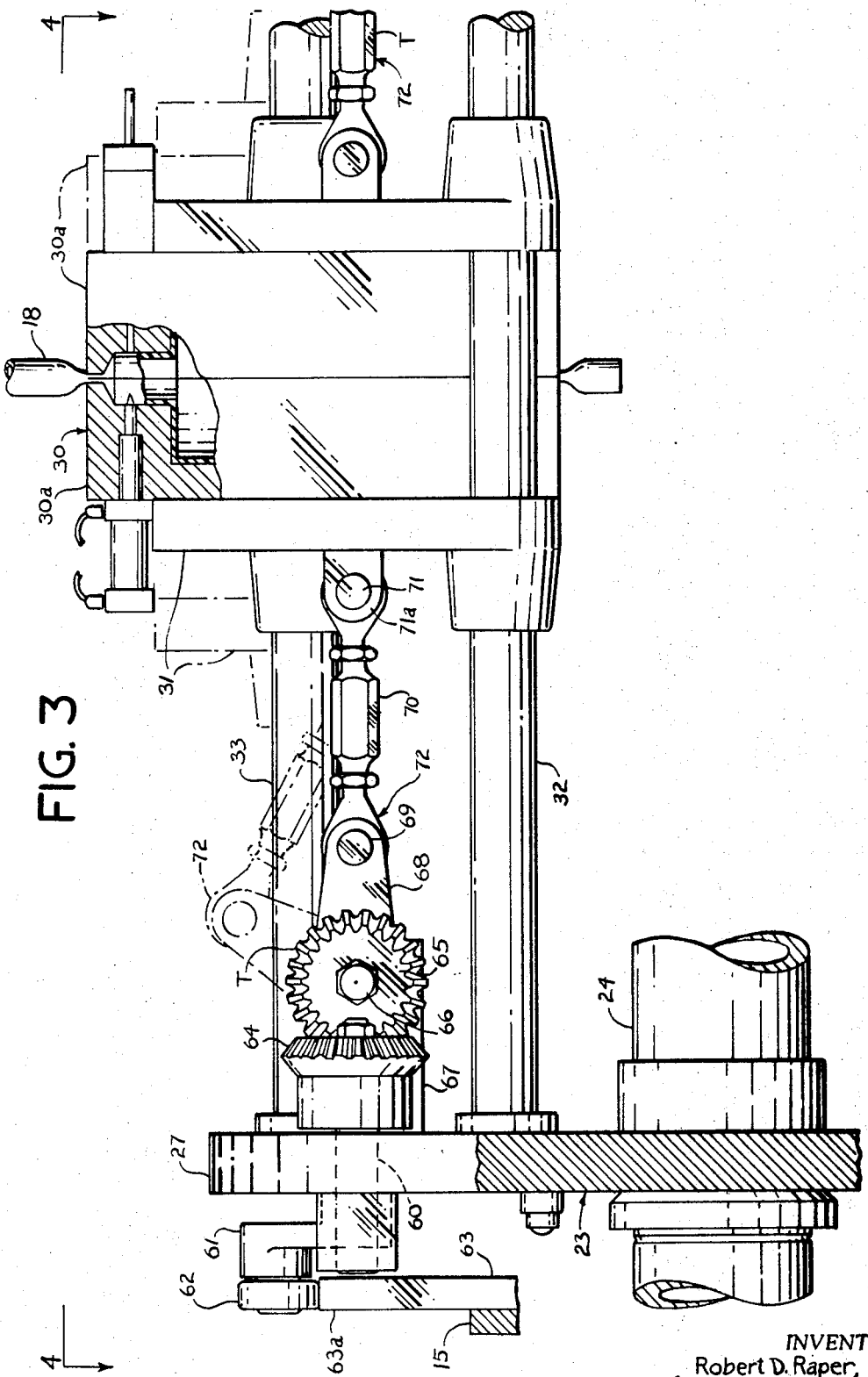
FIG. 3 is a greatly enlarged fragmentary cross-section taken generally on the line 3—3 of FIG. 2, and partly broken away and in cross-section to illustrate the novel toggle machanism of the invention for opening and closing the molds.

Referring now to FIGS. 1 to 5, the positive means for closing and opening each mold, as referred to above, includes a rapidly operable toggle mechanism T on each of opposite sides of each mold unit. Each mechanism T of each pair thereof may include a shaft 60 suitably journalled through its respective wheel plate 27 and has a trigger arm 61 thereon at the outer side of the plate, carrying a roller 62 for intermittent engagement with a mold-closing rise 63a, on a cam plate 63 adjustably affixed on frame 16, as best shown in FIGS. 3 and 6. A bevel gear 64, keyed on an inward extension of shaft 60 meshes with a similar bevel gear 65 keyed on a shaft 66 which is journalled in a bracket 67 mounted on the inner face of plate 27 to rotate about an axis at right angles to the axis of shaft 60. An arm 68 keyed on shaft 66 is pivoted at 69 to one end of longitudinally adjustable turnbuckle type arm 70, which is in turn pivoted at its other end at 71 to a bifurcated lug 71a on the respective mold platen 31, the arms 68 and 70 thereby forming a toggle 72. This toggle arrangement is such that a small turn of shaft 60, by engagement of roller 62 with the rise 63a on cam 63, very quickly extends the toggle 72 from the chain-dotted to the full-line positions thereof shown in FIG. 3. As this action takes place at both sides of the mold simultaneously, small degrees of swinging movement of the opposing side arms 61 are effective, through the two opposite toggle mechanisms T to close the mold 30 about the parison 18, in about one second or less. In this action, the toggle joints are both extended past dead-center on a line between the relatively fixed pivot points at 66 and 71 to full egagement of arms 68 with stops 74 on the brackets 67 (see FIG. 3). For this purpose, in view of the positive nature of the mechanism T, the past dead-center measurement may be as small as one-thousandth of an inch. Because the opposing toggles 72 are both effectively locked past dead-center, no force is necessary to maintain the respective mating mold sections 30a, 30a locked together, and in this way, also, the arms 61 will retain mold-locked positions as shown in FIG. 3, until they are again actuated by cam means.

As the wheel 23 continues to rotate and thereby to move the fully closed mold unit 30 in clockwise direction through its cycle, a valve 76 for each mold has a button 77 which engages a fixed plate 78 to actuate fluid-operated cylinders 95 carried by one of the respective pairs of mating mold halves 30a to cause an air-injection needle 96 to penetrate the aforesaid neck-forming portion of the parison 18a, now contained within the closed mold and sealed at its ends by pinching-portions of the mold, and thereby to admit pressurized fluid, such as air, through the injection needle and expand the parison to the shape of the article-forming cavity of the mold. After the blow-molding step in the full cycle of operation of each mold is completed, the fluid pressure is discontinued by release of the respective valve button 77 from the plate 78, and at about that time the roller 62, on its arm 61, engages a second fixed cam 90 to collapse the opposing pair of knee-joint toggles of mold 30, as shown in chain-dotted lines in FIG. 3, thereby quickly to open mold 30 for ejection of the formed plastic hollow article about the time the open mold starts its upward swing in clockwise direction with the wheel 23. Said ejection of the article may be accomplished by a blast of air applied through an aperture 97 in the other mold half 30a, as by suitably controlled valving device 98 carried by the respective mold half.

Figure 4:
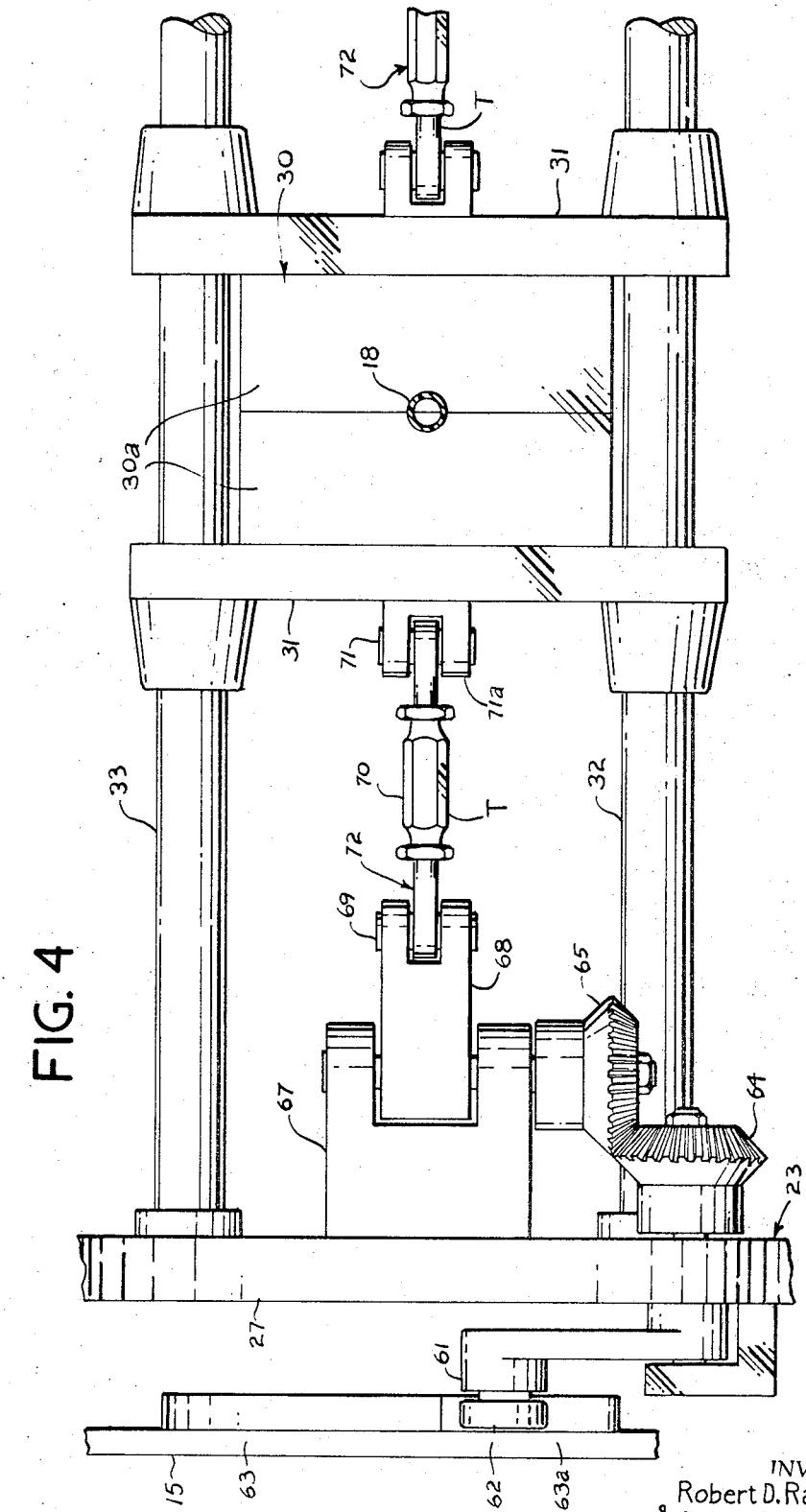
FIG. 4 is a top plan view of the toggle mechanism shown in FIG. 3 and as viewed substantially on the line 4—4.

In operation of the blow-molding machine described for continuous production of plastic bottles or like hollow synthetic resin articles, the mold-carrying wheel 23 is continuously driven in clockwise direction as viewed in FIG. 2, wherein the topmost mold has been instantaneously closed about a predetermined length 18a of parison 18 by its opposed toggle mechanisms T, as shown in full lines in FIGS. 3 and 4. In this step, following a prior full cycle of operation, the previously opened mold is instantly closed and is locked in that condition by the past dead-center positioning of the toggles 72, as described above, and the locked toggles by the same token lock the opposite arms 61 in the radially outwardly positioned relationship to wheel 23, best shown at the top of FIG. 2 (see also FIGS. 3 and 5).

Figure 5:
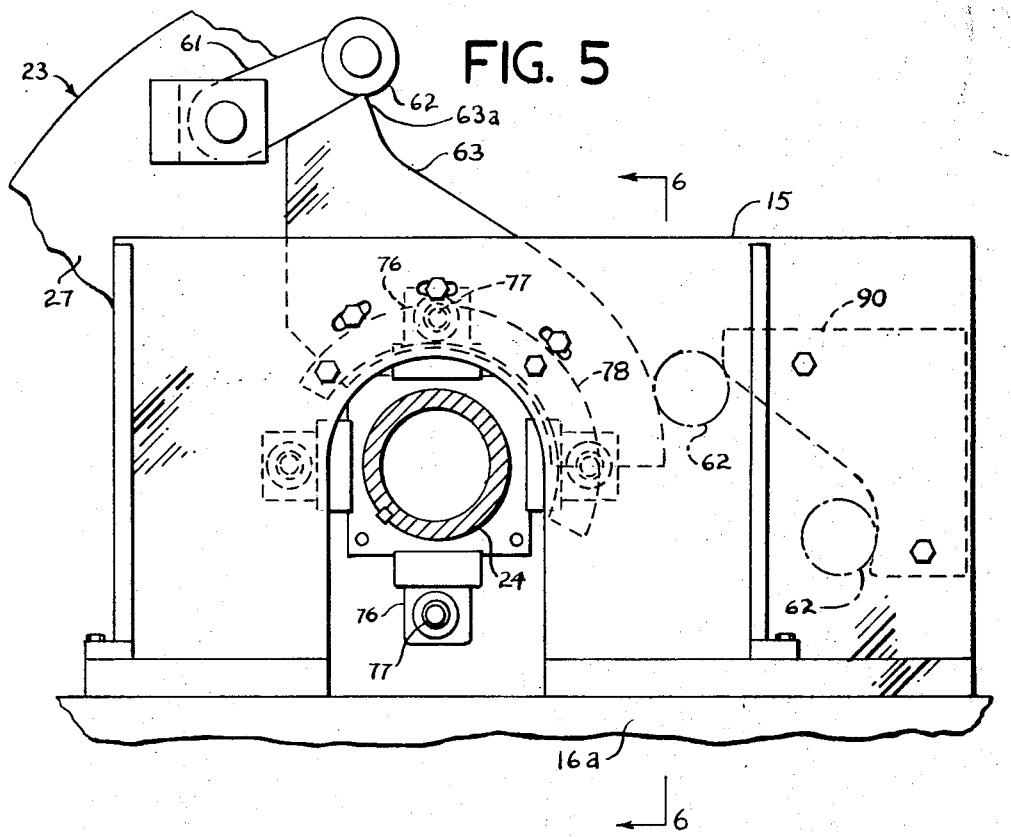
FIG. 5 is an enlarged fragmentary view taken substantially on line 5—5 of FIG. 1.
Figure 6:
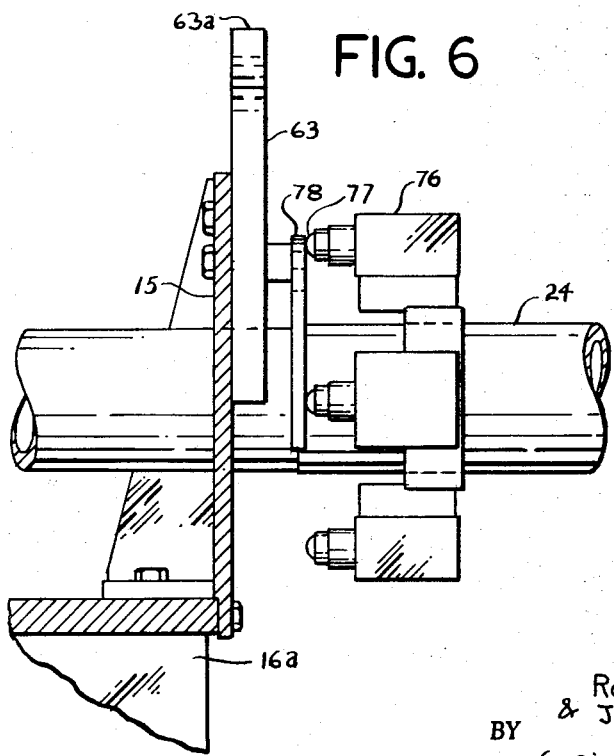
FIG. 6 is a fragmentary cross-section taken substantially on line 6—6 of FIG. 5.
Figure 7:
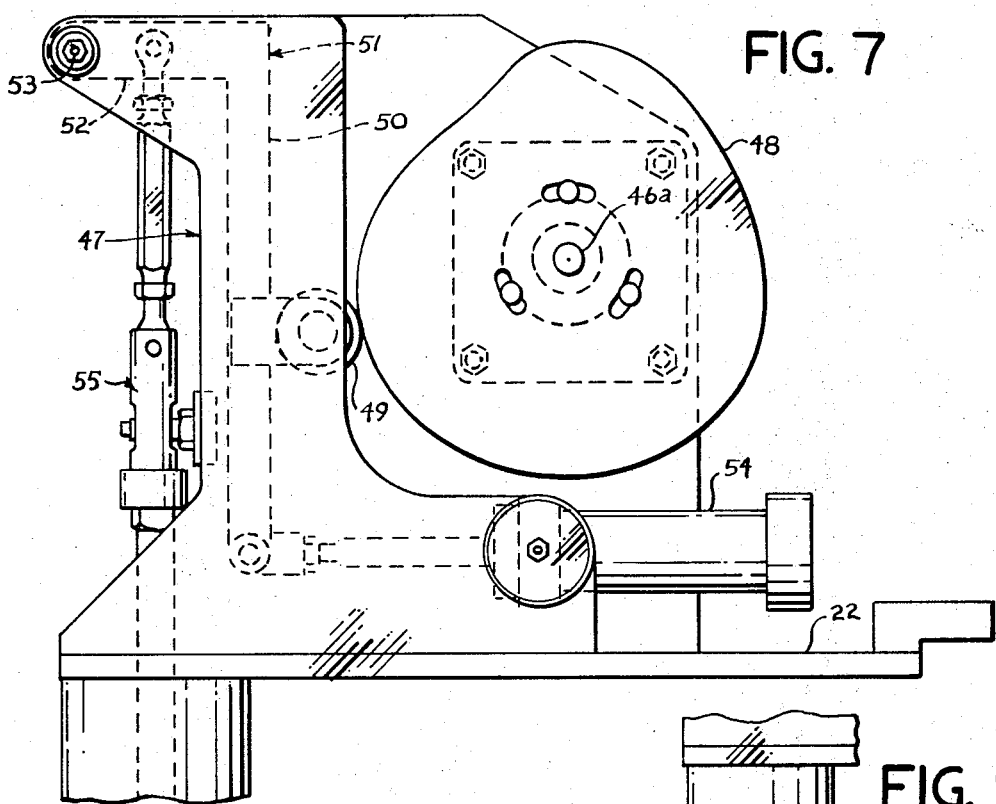
FIG. 7 is an enlarged fragmentary side elevation corresponding to the upper portion of FIG. 2.
Figure 8:
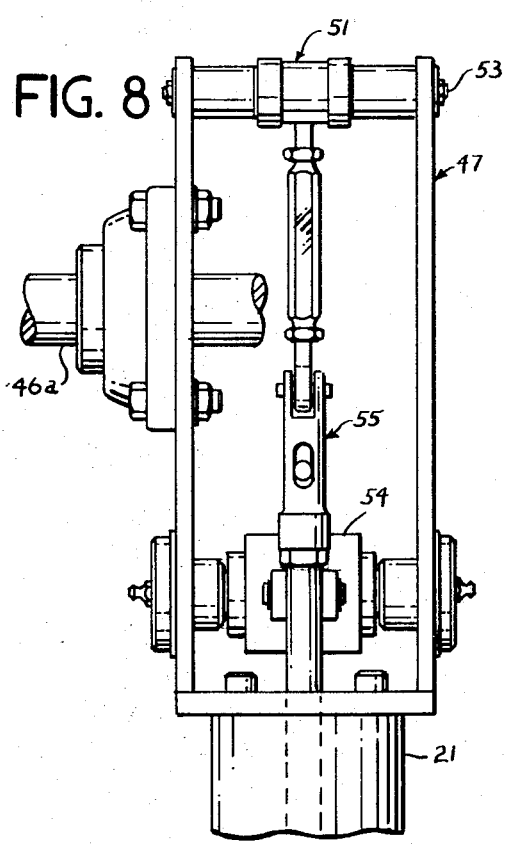
FIG. 8 is a front view of the mechanism as shown in FIG. 7, viewed from the left thereof, and on the same scale.
Figure 9:
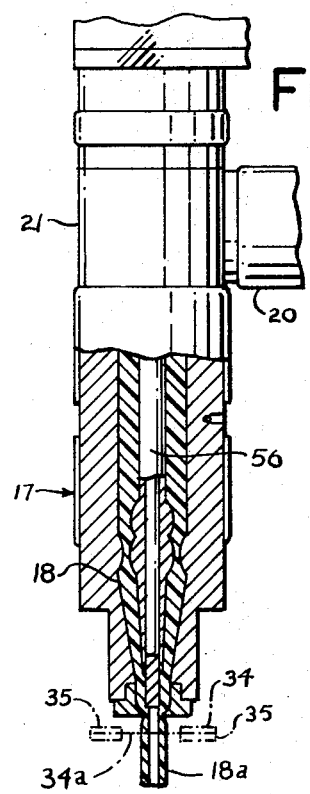
FIG. 9 is an enlarged fragmentary view partly broken away and in cross-section of the extruder nozzle best shown in FIGS. 1 and 2.

With continued peripheral movement of the closed mold in question, the respective valve 76 is actuated, for a suitable portion of one revolution of wheel 23, by disengagement of its button 77 from fixed plate 78 (see FIGS. 6 and 7). This causes the enclosed length 18a of parison 18 to be punctured and blow-molded to form a hollow bottle, as shown in FIG. 3. As the mold continues in its circular path, the valve 76 is opened by reengagement of button 77 with fixed plate 78, just prior to opening of the mold by engagement of two cam-arm rollers 62 with cam 90 (see FIG. 5), and the formed article A is ejected from the mold 30 onto a suitable conveyor or other suitable device (not shown) as by a blast of air from a suitably controlled device.

With continued clockwise movement of wheel 23, the mold rollers 62 are urged from the cam 90 to cam 63 to start the aforesaid mold-closing movement of the toggle mechanisms T, best shown in FIGS. 3 to 5. In this last-described movement the mold valve 76 will have been closed and made inoperative by engagement of its button 77 with fixed plate 78 to present the open mold for reception of another length 18a of parison for a succeeding cycle of operation of that mold. Thus, the mold carrier may be rapidly rotated to process a continuous succession of molds through the above-described cycle of operation to produce a succession of blow-molded hollow articles. Because extrusion of the parison 18 is fed at a controlled rate directly linked to the drive for the mold carrying wheel 23, through the linked drive from a common source of power 28, and because of the stepped relationship of the mold guide bars 32 and 33, there is no interference with feeding of the parison in a fixed vertical line which coincides with the centerlines of the successive molds at the exact moments of rapid closing of the molds by their respective pairs of toggle mechanisms T (see FIGS. 1, 2, and 3).

Thus has been provided a simple, low cost blow-molding machine capable of high-speed production of hollow articles from heat-softened, thermoplastic material to be of consistently high quality. The use of right-angle bevel gears for opening and closing the several pairs of toggle mechanisms T for the mating sections of each mold assures positive locking of the mold sections in closed condition, unaffected by the stationary cams therefor in any way, except for closing and opening the respective molds in succession. Because of this improved arrangement, the time required for changing and adjusting molds in conjunction with the requisite rate of supplying the heat-softened thermoplastic parison is reduced to a minimum. Moreover, due to the positive nature of the opposing pairs of toggle mechanisms there are no loose parts or connections to cause shocks or looseness affecting the time, speed, and efficiency of the machine.

Modifications of the invention may be resorted to without departing from the spirit thereof and the scope of the appending claims.

What is claimed is:

1. Apparatus for blow-molding hollow plastic articles, comprising: a support; a wheel mounted on said support to rotate about a horizontal axis; a plurality of peripherally spaced cavity molds carried by said wheel; means for continuously rotating said wheel at predetermined speed; each said cavity mold having mating sections; means for mounting said mating sections on said wheel to be relatively movable axially thereof toward and from mating relation; a mold-closing mechanism carried by said wheel for relatively moving said mating mold sections toward and from closed mating relation and having actuating means therefor carried by the wheel for operating the mold-closing mechanism; means for continuously extruding a parison of heat-softened plastic material to depend substantially radially of the axis of said wheel substantially in a vertical plane at right angles to said wheel axis, and to be in the path of peripheral movement of the open mold; relatively fixed means in the path of movement of said actuating means with the rotating wheel and engageable therewith during each turn of the wheel to actuate said mold-closing mechanism and urge the mating sections into said closed mating relation for embracing a predetermined length of said extruding parison substantially at the point of centering juncture of the mold and the parison; and cutter means operable substantially at said centering point of juncture to sever said embraced lengths of extruding parison; supply means synchronized with continued rotation of the wheel for supplying pressure medium to the interior of said severed length of parison embraced within the mold to blow-mold the same to the shape of the mold cavity; and means engageable with said actuating means for operating said mold-moving means to open said mating sections for removal of said blow-molded article therefrom; each said mold having a said mold-closing mechanism and actuating parts therefor operable in succession by said relatively fixed means; said wheel including axially spaced side plates having guide means therebetween for each said mold; backing plates slidable on said guide means and supporting said mating mold sections thereon; said mold-closing mechanism including for each mold segment a double arm knee-joint toggle, pivotally connected between the respective mold section and a said wheel side plate outwardly spaced therefrom, to be extended to a past dead-center position when the respective mold is closed; the pivotal connections of the outer toggle arm of each knee-joint toggle with respect to its said side plate including a stem keyed to said outer toggle arm; a trigger arm pivoted on said side plate and operatively connected through meshing gear means to turn said stem and thereby pivot said outer toggle arm; relatively fixed toggle cam means; said trigger arm being movable by rotation of said wheel to engagement with said toggle cam means to turn said stem through said gear means, and thereby to operate the knee-joint toggle toward and from said past dead-center condition thereof.

2. Apparatus as in claim 1, one of said toggle arms of each said knee-joint toggle of opposing pairs thereof being lengthwise adjustable to set the opposing pairs of toggles in condition to attain said past dead-center conditions thereof in the mold-closed condition of the mating mold sections, whereby said trigger arms of the respective toggles are adapted to be retained in corresponding mold-locked position independently of said toggle cam means.

3. Apparatus as in claim 2, wherein said supply means includes an injection device on each said mold for supplying pressure fluid to the interior of said embraced length of parison therein, and valving means connected thereto and operable by rotation of said wheel to actuate the valving means of each closed mold in succession to blow-mold the embraced parison therein.

4. Apparatus for blow-molding hollow plastic articles, comprising: a support; a wheel rotatably mounted on said support to rotate about a horizontal axis and including spaced side members and a plurality of peripherally spaced axially extending guide means affixed between said side members; a pair of axially spaced backing members shiftably mounted on each guide means; means for rotating said wheel; a sectional cavity mold for each guide means and including mating mold sections mounted on said backing members for axial movement therewith toward and from closed mating relation of the mold sections; source means synchronized with the rotational speed of said wheel for continuously extruding a parison of heat-softened plastic material in depending relation in the peripheral path of the successive open molds; mold-closing mechanisms for each mold operable by rotation of said wheel for moving said mold member in axially opposite directions on said guide means thereof successively first to close the molds and thereby embrace lengths of the extruding parison therein and simultaneously to sever said lengths from said source means, and then to open the molds; means synchronized with said closing of the molds to blow-mold the embraced lengths of parison into hollow articles conforming to the shapes of the mold cavities; and means operable upon successive opening of the molds to eject the formed articles therefrom; each said guide means being disposed for unobstructed passage of the extruded parison between the mold sections of successive, peripherally moving, open molds; each said mold-closing mechanism including a pair of double arm knee-joint toggles pivotally connected between said backing members and the outwardly spaced wheel side members thereof, trigger means on said wheel for actuating said toggles toward and from said closed mating relation of the respective mating mold sections, and relatively fixed means engageable with each said trigger means on the rotating wheel for said actuation of said toggles.

5. Apparatus as in claim 4, the pivotal connection of the outer toggle arm of each said toggle with respect to its said side plate of the wheel including a stem keyed to the outer toggle arm, gear means conected between said stem and its said trigger means to be turned thereby for operation of the toggle toward and from past dead-center locking extension of the toggle.

6. Apparatus for blow-molding hollow plastic articles comprising: a support; a wheel rotatably mounted on said support to rotate about a horizontal axis and including spaced side plates and a plurality of peripherally spaced axially extending guide means affixed between said side plates; a pair of axially spaced backing members shiftably mounted on each guide means; means for progressively rotating said wheel; a sectional cavity mold for each guide means and including mating mold sections mounted on said backing members for axial movement therewith toward and from closed mating relation of the mold sections; source means synchronized with the rotational speed of said wheel for continuously extruding a parison of heat-softened plastic material to present end extents thereof predetermined lengths substantially in freely depending relation from said source, and in the peripheral path of successive open molds with continued rotation of said wheel; mold-closing mechanisms for each mold carried by said wheel, operable in succession by continued rotation of the wheel for moving said mold sections of the successive molds in axially opposite directions on said guide means thereof, and thereby successively to close the respective molds and embrace freely depending said end extents of the extruding parison between the respective mating mold sections means synchronized with closing the respective mold simultaneously to sever said freely depending end extents of parison from said source means thereof; means synchronized with said closing of the molds to blow-mold the embraced severed said end extents of parison into hollow articles conforming to the shapes of the closed mold cavities; and means operable upon successive opening of the molds to eject the formed articles therefrom; each said mold-closing mechanism including a pair of double-arm knee-joint toggles pivotally connected between said backing members and the outwardly spaced wheel side plates thereof, trigger means on said wheel for actuating said toggles toward and from said closed mating relation of the respective mold, and relatively fixed means engageable with each said trigger means on the rotating wheel for said actuation of said toggles; the pivotal connection of the outer toggle arm of each said toggle with respect to its said side plate of the wheel including a stem keyed to the outer toggle arm, gear means connected between said stem and its said trigger means to be turned thereby for operation of the toggle toward and from past dead-center locking extension of the toggle.

7. Apparatus for blow-molding hollow plastic articles comprising: a support; a wheel rotatably mounted on said support to rotate about a horizontal axis and including spaced side plates and a plurality of peripherally spaced axially extending guide means affixed between said side plates; a pair of axially spaced backing members shiftably mounted on each guide means; means for progresivly rotating said wheel; a sectional cavity mold for each guide means and including mating mold sections mounted on said backing members for axial movement therewith toward and from closed mating relation of the mold sections; source means synchronized with the rotational speed of said wheel for continuously extruding a parison of heat-softened plastic material to present end extents thereof predetermined lengths substantially in freely depending relation from said source, and in the peripheral path of successive open molds with continued rotation of said wheel; mold-closing mechanisms for each mold carried by said wheel, operable in succession by continued rotation of the wheel for moving said mold members of the successive molds in axially opposite directions on said guide means thereof, and thereby successively to close the respective molds and embrace freely depending said end extents of parison between the respective mating mold sections of the extruding parison; means synchronized with closing the respective mold simultaneously to sever said freely depending end extents of parison from said source means thereof; means synchronized with said closing of the molds to blow-mold the embraced severed said end extents of parison into hollow articles conforming to the shapes of the closed mold cavities; and means operable upon successive opening of the molds to eject the formed articles therefrom.

References Cited

UNITED STATES PATENTS

| 2,230,190 | 1/1941 | Ferngreen. |
| 2,579,399 | 12/1951 | Ruekberg. |
| 3,032,809 | 5/1962 | Willard. |

FOREIGN PATENTS

| 101,026 | 2/1965 | Denmark. |

H. A. KILBY, JR., Primary Examiner